(12) United States Patent
Watanabe

(10) Patent No.: US 6,773,117 B2
(45) Date of Patent: Aug. 10, 2004

(54) FEED SCREW DEVICE

(75) Inventor: Takashi Watanabe, Saitama (JP)

(73) Assignee: Fuji Photo Optical Co., Ltd., Saitama (JP)

(*) Notice: Subject to any disclaimer, the term of this patent is extended or adjusted under 35 U.S.C. 154(b) by 104 days.

(21) Appl. No.: 10/043,216

(22) Filed: Jan. 14, 2002

(65) Prior Publication Data

US 2002/0093629 A1 Jul. 18, 2002

(30) Foreign Application Priority Data

Jan. 12, 2001 (JP) ........................................ 2001-004864

(51) Int. Cl.[7] .......................... G03B 3/00; G03B 21/14; G03B 21/00; G02B 15/14
(52) U.S. Cl. ...................... 353/101; 353/119; 353/122; 359/696
(58) Field of Search ................................ 353/100, 101, 353/119, 122, 30; 349/5, 6, 7, 8; 310/12; 359/696, 694, 683, 703

(56) References Cited

U.S. PATENT DOCUMENTS 5,537,169 A * 7/1996 Park ........................... 353/101
5,618,094 A * 4/1997 Lee ............................ 353/101
6,409,343 B1 * 6/2002 Uchida ....................... 351/208
2002/0047408 A1 * 4/2002 Tanaka ......................... 310/99

FOREIGN PATENT DOCUMENTS

| JP | 3-56925 | 5/1991 | ........... G03B/21/00 |
| JP | 8-304739 | 11/1996 | ........... G02B/27/28 |
| JP | 10-171045 | 6/1998 | ........... G03B/33/12 |

* cited by examiner

Primary Examiner—Russell Adams
Assistant Examiner—Melissa J Koval
(74) Attorney, Agent, or Firm—Young & Thompson

(57) ABSTRACT

Both end parts of a feed screw device are movably supported through cushioning members, and an inertia force of the screw after a movable member moved by the screw has collided against a stopper is absorbed by a movement in an axial direction, so that an impact at a drive end can be softened. When the guide part comes into contact with the stopper and a projection lens barrel is positioned at an upper end of a moving stroke, an upward movement of the barrel is stopped, but a motor is in a rotating state. A driving power of the motor is continuously transmitted to the screw, but since an upward movement of a nut member is restricted, a downward movement force is given from the motor to the screw. Then, the screw moves downward against an urging force of a spring.

7 Claims, 7 Drawing Sheets

FEED SCREW DEVICE

BACKGROUND OF THE INVENTION

1. Field of the Invention

The present invention relates to a feed screw device which moves a projection lens of a liquid crystal projector in parallel.

2. Description of the Related Art

Japanese Patent Application Publication Nos. 8-304739 and 10-171045 disclose liquid crystal projectors constructed such that three liquid crystal panels for red (R), green (G) and blue (B) lights where images are displayed are illuminated by a light source, and image lights passing through these liquid crystal panels for R, G, B are combined by a cross dichroic prism, and this combined image light is projected onto a screen by a projection lens.

Japanese Utility Model Application Publication No. 3-56925 discloses a liquid crystal projector having a movable part which moves the projection lens vertically in parallel, for preventing a trapezoid distortion of the projected image at the time of vertically moving on the screen. The above-described movable part comprises a feed screw (lead screw), and by rotating the feed screw, the projection lens which is supported by this feed screw through a nut member moves vertically in parallel relative to the liquid crystal projector main body.

In the case where such a feed screw is driven by a motor, it is necessary that a stopper is arranged at the drive end (stroke end), and that a slip mechanism such as a friction clutch is provided between the feed screw and the motor for softening the impact at the time when the projection lens side collides against this stopper, which is not disclosed in Japanese Utility Model Application Publication No. 3-56925. Since the inertia force of the feed screw, that is, the inertia force of the motor is absorbed by this slip mechanism, the above-described impact can be softened.

Furthermore, the impact at the drive end can also be softened by such a method where a switch which detects the drive end is provided instead of the stopper, and the motor is stopped and controlled when this switch detects the drive end.

However, in the case of the above described conventional feed screw device which cushions the inertia force of the motor by the slip mechanism, there has been such a problem that it is difficult to control the slip torque depending on the place where the slip mechanism should be used, which is found based on the magnitude of the deceleration. Furthermore, there has also been such a weak point that since the rotational torque of the feed screw is set smaller than the slip torque of the slip mechanism, it is difficult to transmit a large torque to the feed screw.

On the other hand, in the case of the above described conventional feed screw device with a switch which detects the drive end, there has also been such a weak point that it is difficult to accurately set the stroke of ON-OFF of the switch, and furthermore, it is difficult to accurately stop the projection lens at the drive end because of the inertia of the motor.

SUMMARY OF THE INVENTION

The present invention has been achieved in view of the above described circumstances, and has as its object the provision of an improved feed screw device with a simple structure, in which it is possible to transmit a torque larger than that of the feed screw device using the slip mechanism to the feed screw, and it is possible to accurately stop the movable member at the drive end, and it is possible to sufficiently soften the impact at the drive end.

In order to attain the above described object, the present invention is directed to a feed screw device, comprising: a feed screw which is driven by driving power of a motor; shaft bushes which are provided movably in an axial direction of the feed screw to rotatably support both end parts of the feed screw; and cushioning members through which the shaft bushes are supported by stationary parts.

According to an embodiment of the present invention, both end parts of the feed screw are supported through the shaft bushes and the cushioning members movably in the axial direction thereof, and therefore, an inertia force of the feed screw after the movable member moved by the feed screw has collided against the stopper is absorbed by the movement of the feed screw in the axial direction. Accordingly, the impact at the drive end can be softened.

Moreover, an embodiment of the present invention has such a structure where the feed screw is moved in the axial direction, and therefore, it is possible to transmit a torque larger than that of the conventional feed screw device using a slip mechanism to the feed screw. Furthermore, it is possible to forcibly stop the movable member at the drive end by using a stopper as mentioned above, and therefore, the movable member can accurately be stopped at the drive end.

Furthermore, according to an embodiment of the present invention, the above-described motor is stopped by a control device when the movement in the axial direction of the feed screw is detected by a detecting device. Thereby, the motor is certainly stopped.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Hereunder embodiments will be described in detail for the structure of the device according to the preferred embodiments of the present invention in accordance with the accompanied drawings.

Figure 1:
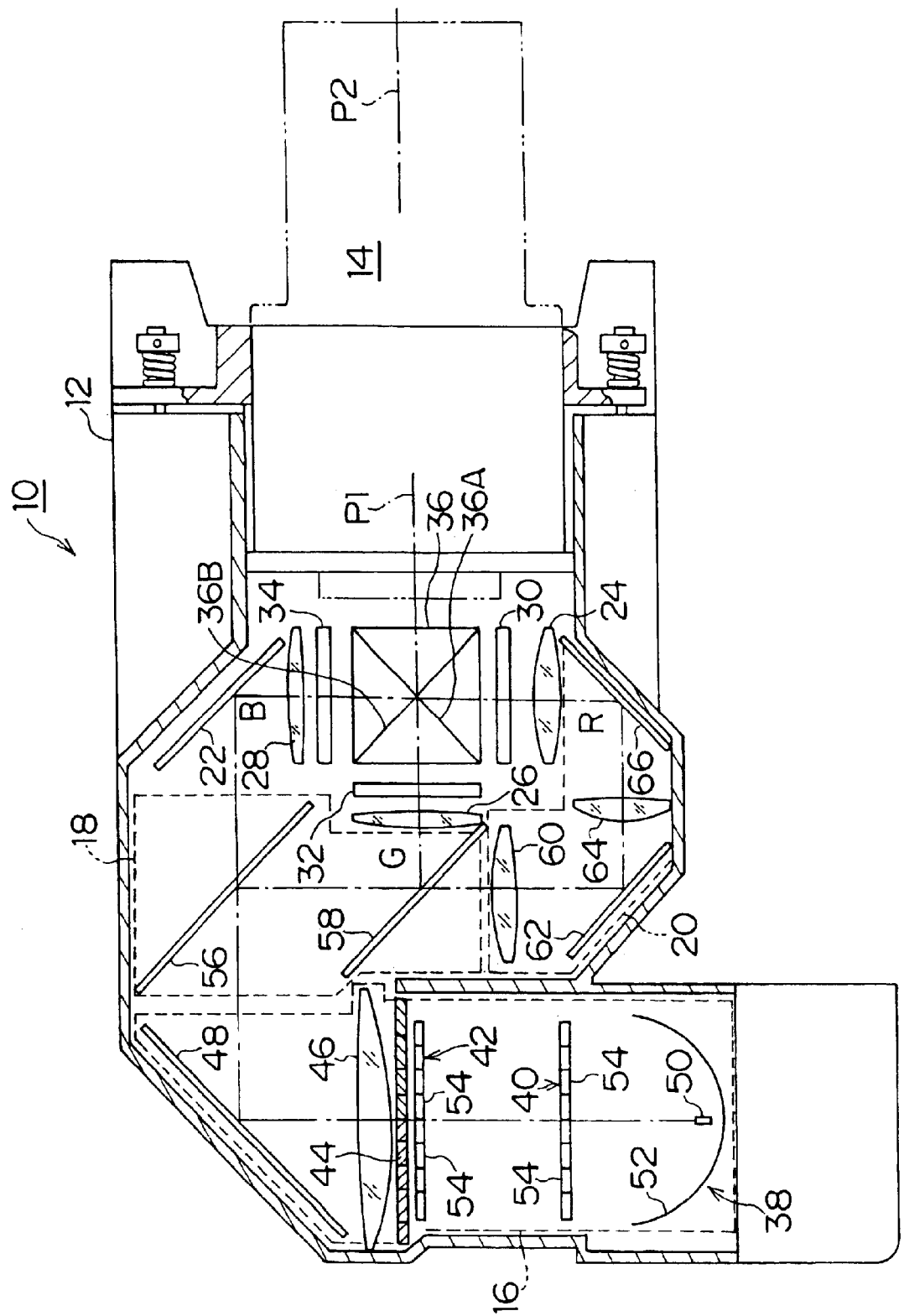
FIG. 1 is a construction plan of a liquid crystal projector to which a feed screw device of a preferred embodiment is applied.

FIG. 1 is a construction plan of a liquid crystal projector to which a feed screw device of the preferred embodiment is applied, and this liquid crystal projector 10 comprises: a projector main body 12 which is constructed like a box; and a projection lens barrel 14 (shown in FIG. 1 by an alternate long and two short dashes line) which is vertically moved by the above described feed screw device.

To the projector main body 12, an illumination system 16, a color light separating system 18, a light guide system 20, a reflection mirror 22, three field lenses 24, 26, 28, three liquid crystal panels 30, 32, 34 for R, G, B, and a cross dichroic prism 36 are provided at specified positions, respectively.

The illumination system 16 includes a light source 38, two lens arrays 40, 42, a polarization converting element 44, a condensing lens 46, and a reflection mirror 48. The light source 38 includes a mercury-vapor lamp 50, and a reflector 52, and this reflector 52 is formed like a concave mirror to emit radiation outgoing from the mercury-vapor lamp 50 as approximately parallel light fluxes.

The lens arrays 40, 42 are composed such that a lot of small lenses 54, 54 . . . with a rectangular outline are arranged like a matrix, and formed like a rectangular plate as a whole. Each of the small lenses 54, 54, . . . of the lens array 40 can separate the approximately parallel light fluxes outgoing from the light source 38, into partial light fluxes of a number corresponding to the number of small lenses 54, and can condense each partial light flux near the lens array 40.

The polarization converting element 44 is a converting element which converts the incident light into predetermined linear polarized light components, and includes a polarized beam splitter array (not shown in the drawing) and a selective phase difference plate (not shown in the drawing). The polarized beam splitter array can separate the plurality of partial light fluxes which are divided by the lens arrays 40, 42 into two kinds of linear polarized lights (polarized light p, polarized light s), respectively. Furthermore, the selective phase difference plate can convert the polarized light p into the polarized light s, among the polarized light p and the polarized light s separated by the polarized beam splitter array. As a result of this, all light fluxes with random polarized directions which come into the polarization converting element 44 go out as the polarized light s.

The plurality of partial light fluxes of the polarized light a outgoing from the polarization converting element are condensed by a condensing lens 46, and after that, they are totally reflected by the reflection mirror 48 to go out to the color light separating system 18. By the illumination system 16 constructed like this, three liquid crystal panels 30, 32, 34 for R, G, B are illuminated with an approximately uniform brightness.

The color light separation system 18 has two dichroic mirrors 56, 58, and separates the white light reflected by the reflection mirror 48 into the lights of three colors of R, G, B. The dichroic mirror 56 transmits the blue light (B) component of the white light, and in the meantime, it reflects the green light (G) component and the red light (R) component. The blue light (B) passing through the dichroic mirror 56 is reflected by the reflection mirror 22, and by passing through the field lens 28, it becomes approximately parallel light fluxes to illuminate the liquid crystal panel 34 for B.

Between the red light (R) and the green light (G) reflected by the dichroic mirror 56, the green light (G) is reflected by the dichroic mirror 58, and by passing through the field lens 26, it becomes approximately parallel light fluxes to illuminate the liquid crystal panel 32 for G. On the other hand, the red light (R) passes through the dichroic mirror 58, and after that, it comes into the field lens 24 through a relay lens 60, a reflection mirror 62, a relay lens 64, and a reflection mirror 66 which combine the light guide system 20. Then, by passing through the field lens 24, the red light (R) becomes approximately parallel light fluxes to illuminate the liquid crystal panel 30 for R. Furthermore, at the outgoing surfaces of the field lenses 24, 26, 28, polarizing plates (not shown in the drawing) are attached, respectively, and by these polarizing plates, the angles of the outgoing lights of the field lenses 24, 26, 28 are fitted to the incident angles for coming into the liquid crystal panels 30, 32, 34.

Three liquid crystal panels 30, 32, 34 modulate the image signal outputted from the liquid crystal drive part (not shown in the drawing) into color lights of three colors, respectively to display that modulated image. This image is illuminated by the outgoing lights of the field lenses 24, 26, 28, and each of the passing image lights thereof comes into the cross dichroic prism 36. In the cross dichroic prism 36, a dielectric multi-layer film 36A of the red reflection and a dielectric multi-layer film 36B of the blue reflection are formed like a cross, and here, the above described respective image lights are combined. The combined image light is emitted toward the projection lens barrel 14 from the cross dichroic prism 36, and then, by the projection lens barrel 14, it is projected on a screen (not shown in the drawing). Consequently, a color picture is projected on the screen.

Figure 2:
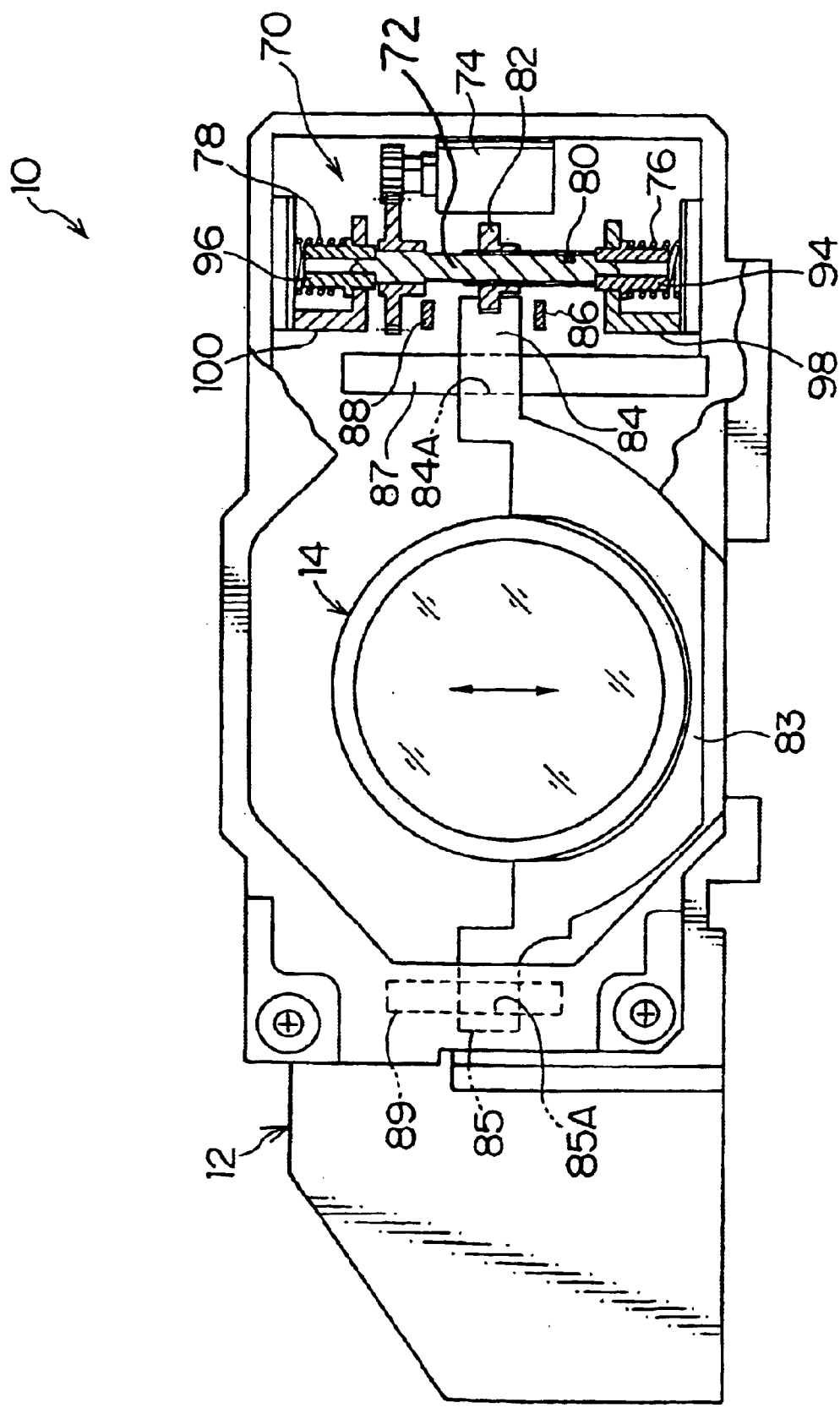
FIG. 2 is a front view of the liquid crystal projector shown in FIG. 1.
Figure 3:
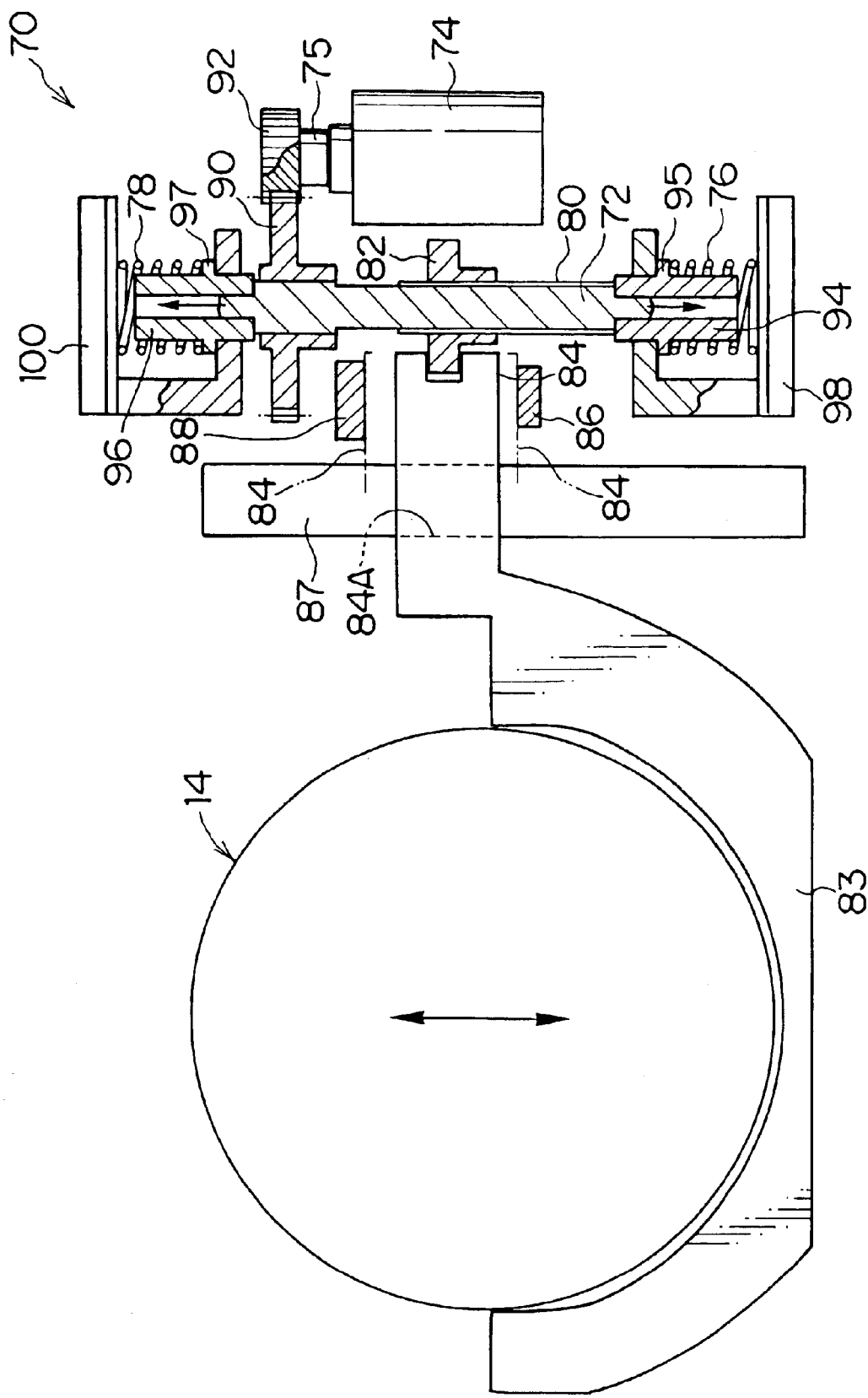
FIG. 3 is a cross sectional view showing the structure of the feed screw device of a first embodiment.

The projection lens barrel 14 is vertically movably supported by the projector main body 12 through a-feed screw device 70 shown in FIGS. 2 and 3.

The feed screw device 70 comprises a feed screw 72, a motor 74, and a pair of springs 76 and 78 that are cushioning members. The feed screw 72 is provided vertically relative to the projector main body 12 shown in FIG. 1, and in the meantime, onto a male screw part 80 formed on the periphery thereof, a nut member 82 is screwed. To the nut member 82, a guide part 84 is engaged, which horizontally protrudes from a holding stand 83 for holding the projection lens barrel 14, and the holding stand 83 is supported vertically movably by a pair of guide bars 87, 89 shown in FIG. 2. The guide bar 87 is inserted into a through hole 84A formed vertically in the guide part 84, and the guide bar 89 is inserted into a through hole 85A formed vertically in the guide part 85 protruding to the opposite side relative to the guide part 84.

The vertical moving stroke of the projection lens barrel 14 is defined by the contact of the guide part 84 with the stoppers 86, 88 which are provided vertically having the guide part 84 held between them.

At the upper part of the feed screw 72, a gear 90 is fixed. To this gear 90, a pinion gear 92 which is attached to the output shaft 75 of the motor 74 is meshed. Accordingly, when the driving power of the motor 74 is transmitted to the feed screw 72 through the gear 90 from the pinion gear 92 to rotate the feed screw 72, the projection lens barrel 14 is vertically moved and the vertical position thereof is adjusted by the feeding action of the nut member 82 by the feed screw 72 and the strait-going action by the above described guide member.

In the feed screw 72, the lower end part thereof is connected to a movable shaft (shaft bush) 94, and furthermore, the upper end part is also connected to a movable shaft (shaft bush) 96 which is formed like a cylinder. The movable shaft 94 is supported rotatably with a support member 98 fixed to the projector main body 12 in FIG. 1, and in the meantime, it is urged upward by the spring 76 which is arranged with elasticity between a flange 95 of the movable shaft 94 and the support member 98.

Furthermore, the movable shaft 96 is also similarly supported rotatably with a support member 100 fixed to the projector main body 12, and in the meantime, it is urged downward by the spring 78 which is arranged with elasticity between a flange 97 of the movable shaft 96 and the support member 100. Accordingly, the feed screw 72 is supported vertically movably by the projector main body 12 through the springs 76, 78.

Figure 4:
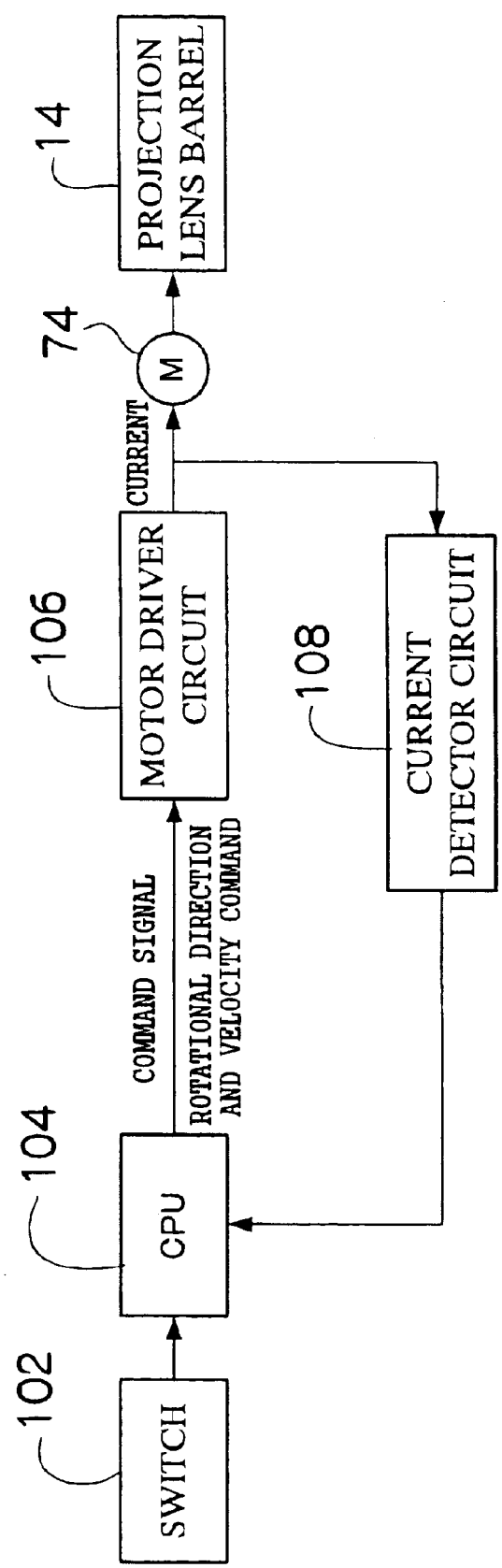
FIG. 4 is a block diagram showing a control system of the feed screw device shown in FIG. 3.

Next, the action of the feed screw device 70 will be described. First, this feed screw device 70 acts by operating a manual switch 102 shown in FIG. 4. At the time of turning ON the switch 102 to the upward moving side, a CPU 104 outputs a command signal of the rotational direction and velocity to a motor driver circuit 106. Consequently, the current corresponding to the above described command signal of the rotational direction and velocity is supplied to the motor 74 from the motor driver circuit 106 to drive the motor 74, and therefore, the feed screw 72 is normally rotated, and accordingly, the projection lens barrel 14 moves upward in FIG. 3.

Then, when the guide part 84 comes into contact with the stopper 88 and the projection lens barrel 14 is positioned at the upper end of the moving stroke, the upward movement of the projection lens barrel 14 is stopped, but the motor 74 is not stopped and is in the rotational state. Accordingly, the driving power of the motor 74 is continuously transmitted to the feed screw 72, but at this moment, since the movement of the nut member 82 is restrained, the downward moving force is given to the feed screw 72 from the motor 74. Then, since the feed screw 72 is supported vertically movably by the springs 76, 78, it moves downward against the urging force of the spring 76. By this action, the impact force at the time when the guide part 84 comes into contact with the stopper 88 is softened.

After this, continuously, the motor 74 is driven, but since a load based on the urging force of the spring 76 is transmitted to the motor 74, the current value of the motor 74 rises. This motor current value is detected by the current detector circuit 108 in FIG. 4 to be monitored by the CPU 104 at all times. In the CPU 104, the current value which is supposed to rise right after the contact of the guide part 84 with the stopper 88 is previously stored, and when the motor current value exceeds that current value, the motor driver circuit 106 is controlled to stop the motor 74. Consequently, the motor 74 is stopped before an overload is applied to the motor 74, and therefore, it is possible to protect the motor 74, the pinion gear 92, and the gear 90 from the above described overload. Furthermore, the action of the feed screw device 70 based on the downward movement of the projection lens barrel 14 is basically the same as the action based on the downward movement of the projection lens barrel 14, and therefore, here, the description thereof will be omitted.

Thus, according to the feed screw device 70 of the preferred embodiment, the feed screw 72 moves in the axial direction to soften the impact at the moving stroke end, and therefore, it is possible to transmit a torque larger than that of the conventional feed screw device using the slip mechanism to the feed screw 72. Moreover, if the feed screw device 70 is adopted, it is possible to forcibly stop the projection lens barrel 14 at the moving stroke end by using the stoppers 86, 88, and therefore, the projection lens barrel 14 can accurately be stopped at the moving stroke end.

Figure 5:
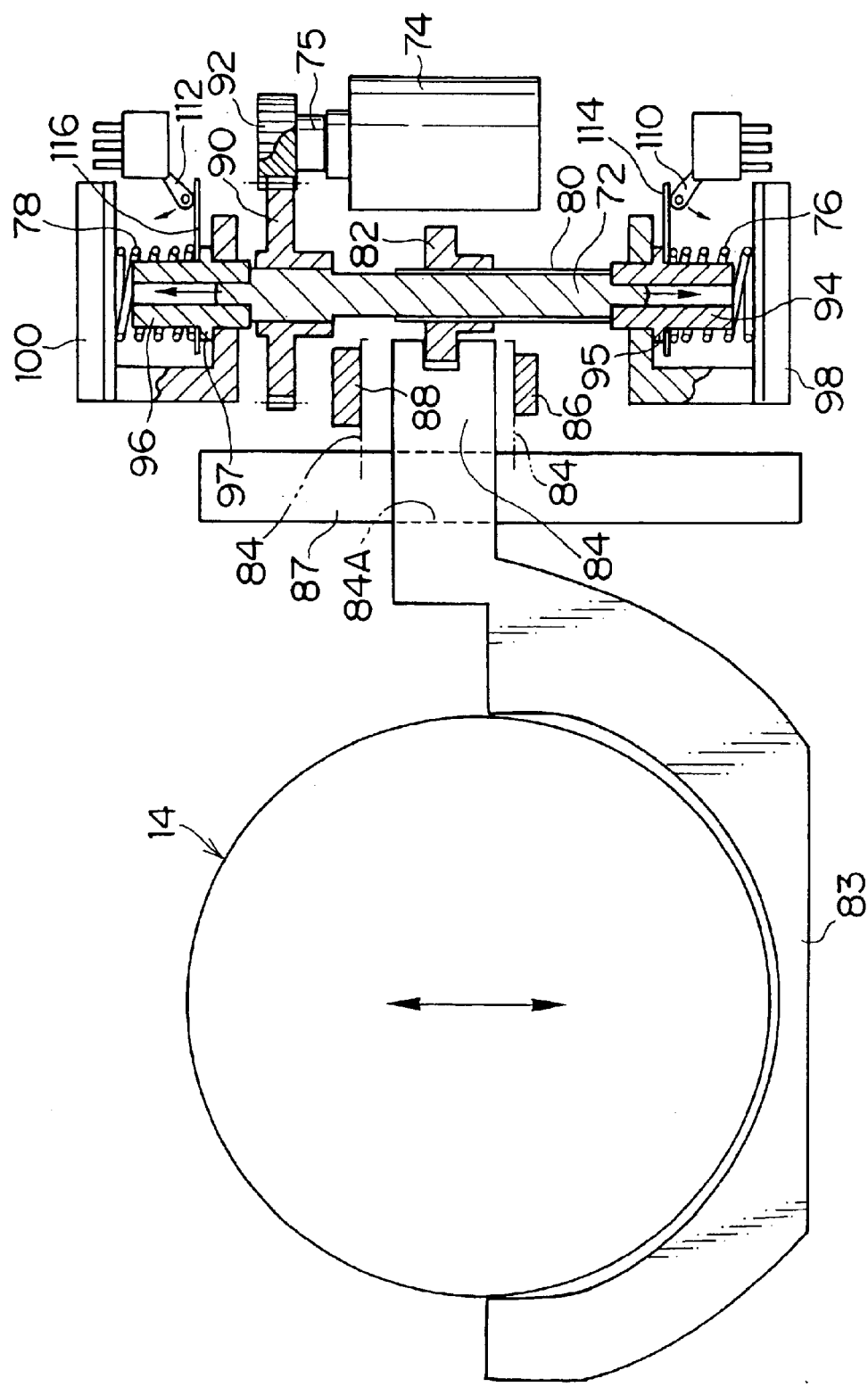
FIG. 5 is a cross sectional view showing the structure of the feed screw device of a second embodiment.

FIG. 5 shows a second embodiment of the feed screw device, and to the members which are identical with or similar to those of the feed screw device 70 of the first embodiment shown in FIG. 3, the same reference marks are given.

To the feed screw device shown in FIG. 5, a switch 110 which detects the downward movement of the feed screw 72 and a switch 112 which detects the upward movement of the feed screw 72 are provided. The switch 110 is turned ON by being pressed with a switch plate 114 attached to the flange 95 of the movable shaft 94, and furthermore, the switch 112 is turned ON by being pressed with a switch plate 116 attached to the flange 97 of the movable shaft 96.

Figure 6:
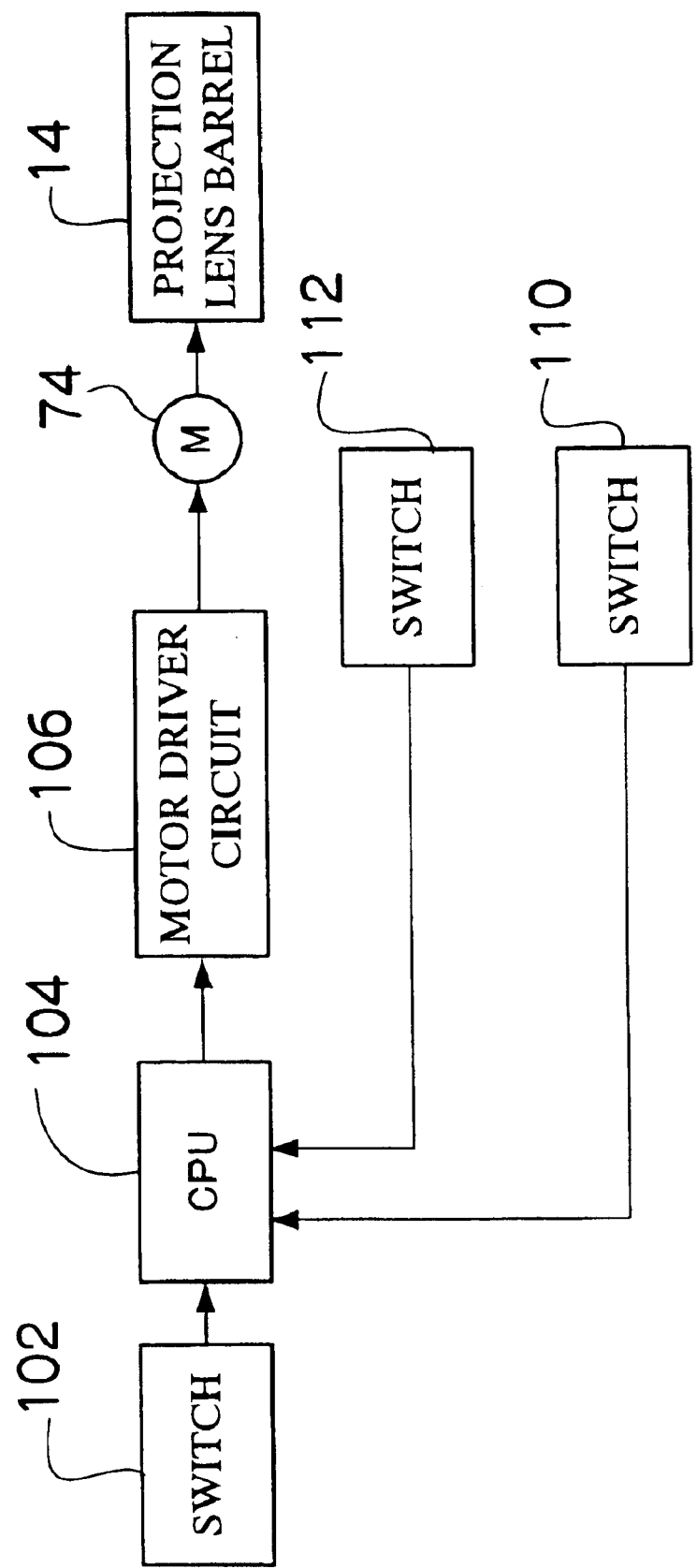
FIG. 6 is a block diagram showing the control system of the feed screw device shown in FIG. 5.

When one of the switches 110, 112 is turned ON, that is, when the projection lens barrel 14 is positioned at one of the moving stroke ends, the CPU 104 in FIG. 6 controls the motor driver circuit 106 to stop the motor 74. Thus, by using the switches 110, 112, the motor 74 can surely be stopped.

As mentioned above, according to the feed screw device described in the preferred embodiment, the structure is such a simple structure where the feed screw 72 is movably supported by the springs 76, 78, and therefore, the manufacturing cost can be reduced, and moreover, the necessary strength of the driving system can be lowered, and therefore, the degree of freedom of the design is widened.

Figure 7:
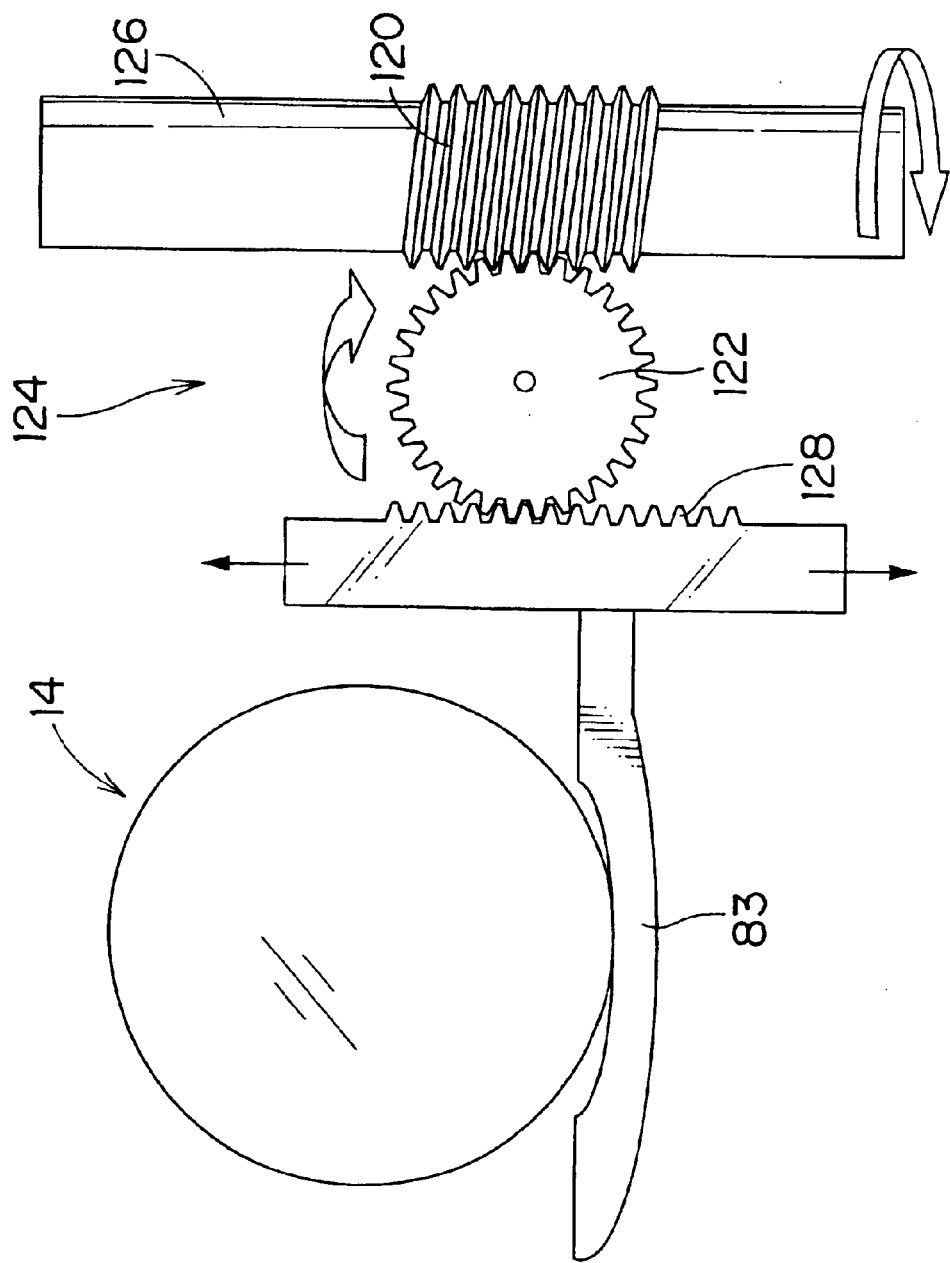
FIG. 7 is a construction plan showing an example of the feed screw device made of a worm and a worm wheel.

Moreover, in the preferred embodiment, a feed device using a feed screw device has been described, however, instead of this feed screw device, by a feed device 124 including a worm 120 and a worm wheel 122 shown in FIG. 7, a feed device of the projection lens barrel 14 can also be obtained.

In the case of the feed device 124 shown in FIG. 7, the worm 120 is formed to a shaft 126 corresponding to the feed screw 72 in FIG. 3, and with this worm 120, a worm wheel 122 is meshed, and in the meantime, with the worm wheel 122, a rack 128 formed to the holding stand 83 is meshed. Accordingly, when the shaft 126 is rotated by a motor (not shown in the drawing), the worm wheel 122 meshed with the worm 120 rotates, and then, the holding stand 83 connected to the worm wheel 122 through the rack 128 vertically moves by the power of the worm wheel 122. Accordingly, the projection lens barrel 14 can also vertically be moved with this feed device 124 instead of the feed screw device.

As mentioned above, according to the feed screw device of the embodiment of the present invention, both end parts of the feed screw are movably supported through shaft bushes and cushioning members, and therefore, it is possible to transmit a torque larger than that of the feed screw device using a slip mechanism to the feed screw, and it is possible to stop the movable member accurately at the drive end, and then, it is possible to sufficiently soften the impact at the drive end. Furthermore, the structure becomes simple.

Furthermore, according to the embodiment of the present invention, the above described motor is stopped by the control device when the movement in the axial direction of the feed screw is detected by a detecting device, and therefore, the motor can surely be stopped at the drive end.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A feed screw device, comprising:

a motor;

a feed screw rotatably driven about a longitudinal axis by said motor;

first and second shaft bushes connected at respective first and second ends of said feed screw, said first and second bushes being axially movable along said longitudinal axis;

a fixed support for housing said first and second shaft bushes; and resilient members for cushioning said first and second shaft bushes against said fixed support.

2. The feed screw device according to claim 1, wherein the first and second shaft bushes each comprise a flange.

3. The feed screw device according to claim 2, wherein the resilient members are springs, and wherein said springs urge the flange against the fixed support.

4. The feed screw device according to claim 1, wherein the feed screw device moves a projection lens barrel of a liquid crystal projector.

5. The feed screw device according to claim 1, further comprising a nut threaded on said feed screw to move a movable member along a moving stroke when the feed screw is rotated.

6. The feed screw device according to claim 1, further comprising:

a detecting device which detects movement of the feed screw in the axial direction; and a control device which stops the motor when said movement of the feed screw in the axial direction is detected by the detecting device.

7. The feed screw device according to claim 1, further comprising a gear fixed to said feed screw, wherein said motor comprises an output shaft having a pinion gear at one end, and wherein said pinion gear drives said gear to rotate said feed screw.

* * * * *